United States Patent
Tu et al.

(10) Patent No.: US 7,573,545 B2
(45) Date of Patent: Aug. 11, 2009

(54) REDUCING COLOR SHIFT

(75) Inventors: Pei Shan Tu, Tainan (TW); Chun Jui Wang, Tainan (TW)

(73) Assignee: Chi Mei Optoelectronics Corp. (TW)

( * ) Notice: Subject to any disclaimer, the term of this patent is extended or adjusted under 35 U.S.C. 154(b) by 160 days.

(21) Appl. No.: 11/804,139

(22) Filed: May 17, 2007

(65) Prior Publication Data

US 2007/0296891 A1   Dec. 27, 2007

(30) Foreign Application Priority Data

May 17, 2006   (TW) .............................. 95117531 A

(51) Int. Cl.
*G02F 1/1335* (2006.01)
*G02F 1/13* (2006.01)

(52) U.S. Cl. .................. 349/96; 349/117; 349/119; 349/187

(58) Field of Classification Search .......... None
See application file for complete search history.

(56) References Cited

U.S. PATENT DOCUMENTS 6,919,946 B2 * 7/2005 Allen et al. ............... 349/121
7,079,218 B2 * 7/2006 Park et al. ................. 349/191

* cited by examiner

*Primary Examiner*—Tina M Wong
(74) *Attorney, Agent, or Firm*—Trop, Pruner & Hu, P.C.

(57) ABSTRACT

A liquid crystal display device reduces the color shift problem typically observed at wide viewing angles; the device includes a phase retardation compensation film, a biaxial compensation film, and a liquid crystal display panel between the two films. Refractive indexes of the phase retardation compensation film having a thickness $d_1$ and the biaxial compensation film having a thickness $d_2$ are $n_{x1}$, $n_{y1}$, $n_{z1}$, $n_{x2}$, $n_{y2}$, and $n_{z2}$ in a first, a second and a third directions perpendicular to each other. The third direction is parallel to the normal directions of the surfaces of the phase retardation compensation film and the biaxial compensation film. Optical compensation values of the phase retardation compensation film and the biaxial compensation film are $R_{th1}$ and $R_{th2}$ and derived from $[(n_{x1}+n_{y1})/2 - n_{z1}] \times d_1$ and $[(n_{x2}+n_{y2})/2 - n_{z2}] \times d_2$ respectively. $R_{th1}$ is not less than 50 nm, and the sum of $R_{th1}$ and $R_{th2}$ can be equal to 271 nm.

20 Claims, 10 Drawing Sheets

(4 of 10 Drawing Sheet(s) Filed in Color)

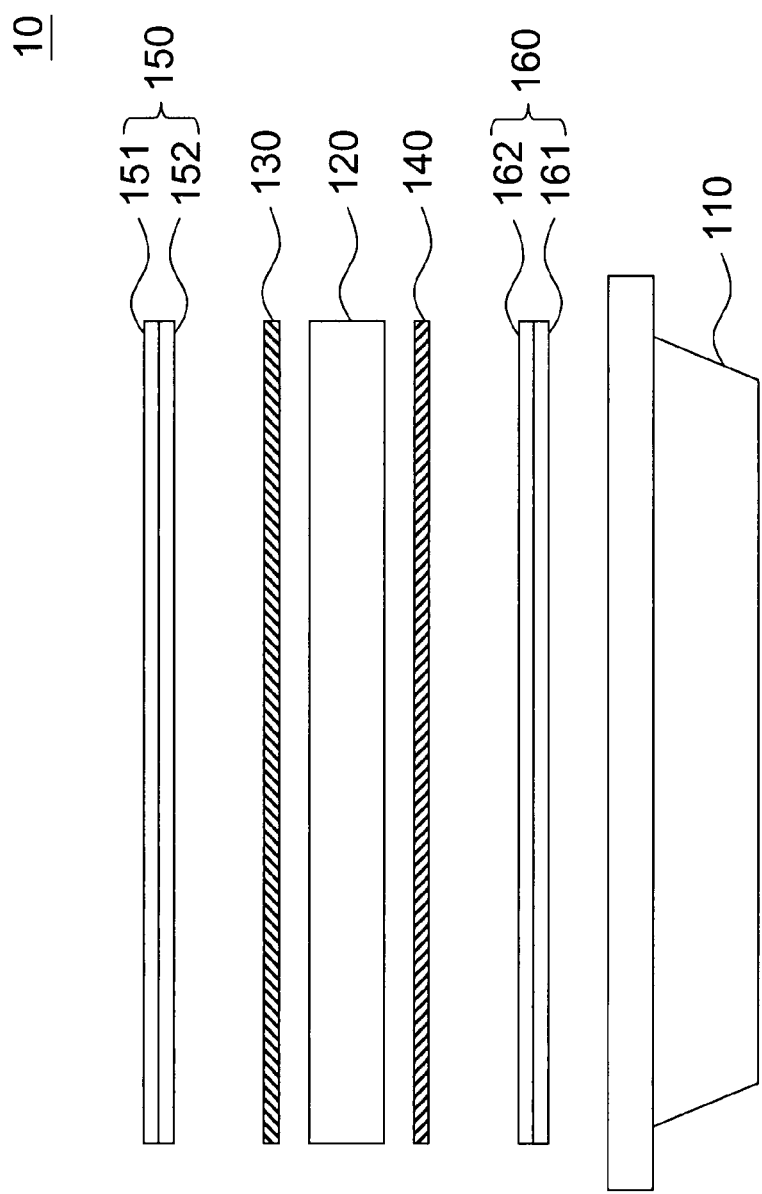
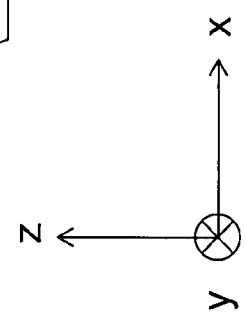
FIG. 1A

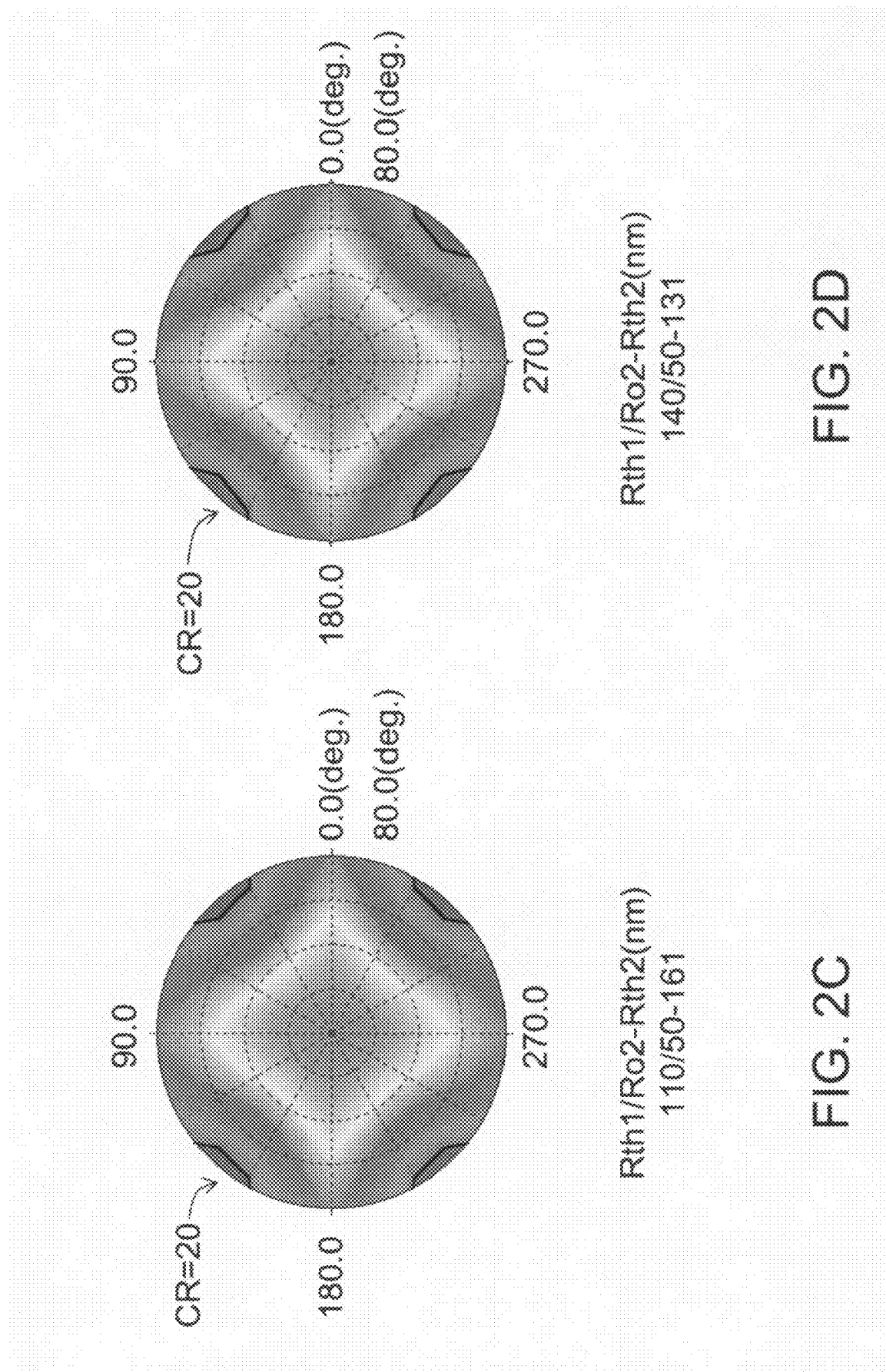

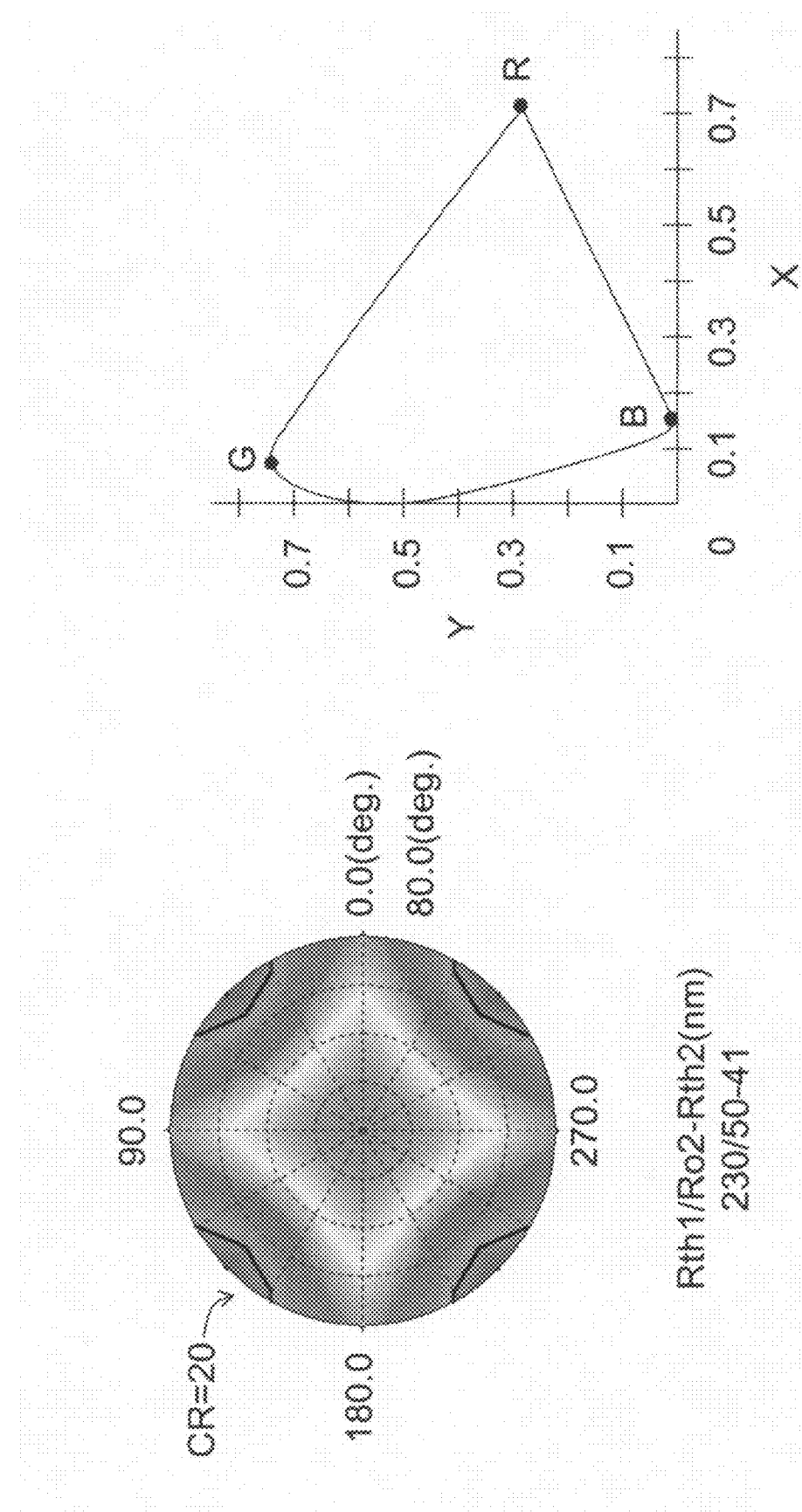

REDUCING COLOR SHIFT

CROSS REFERENCE TO RELATED APPLICATION

This claims priority under 35 U.S.C. § 119 of Taiwan Application No. 095117531, filed May 17, 2006.

TECHNICAL FIELD

The present invention relates generally to reducing color shift in liquid crystal display panels and devices.

BACKGROUND

In the development of liquid crystal display devices, the problems including limited viewing angle and slow reaction speed of liquid crystal have been gradually overcome. Color shift with the variation of viewing angle, however, remains a problem especially in the alternating process between the bright state and the dark state or the gray level transformation. Thus, although a liquid crystal display device displays the same image, colors observed in different viewing angles are different from each other. For example, when an image is observed as the blue sky within a small viewing angle centered near normal incidence, the same image is observed as the dark blue or light blue sky as the viewing angle is increased. Color shift is more obvious with the change of the viewing angle in the dark state. As used herein the term "viewing angle" refers to an angle made between an eye direction and a perpendicular at a given point on the display surface.

Conventional optical compensation in the dark state of the liquid crystal display device mainly includes two aspects. The first aspect is focused on the light leakage in different viewing angles when absorption axes of an upper polarizer and a lower polarizer are not orthogonal. The second aspect is focused on the phase retardation resulting from the liquid crystals of the liquid crystal display device in different viewing angles. An optical compensation film can be disposed on both sides of the liquid crystal panel to increase the contrast ratio of the liquid crystal display panel in a large viewing angle and to improve performance. For example, one or more polarizers may be combined with an optical compensation film such as an A-plate compensation film, a C-plate compensation film, or a biaxial compensation film to reduce the light leakage in a large viewing angle. As the biaxial compensation films work best, its use is more prevalent. The cost of the biaxial compensation film however precludes its use on both sides of the liquid crystal display panel; thus, this type of film is usually disposed on only one side of a liquid crystal display panel. That is, only the biaxial compensation film is disposed between the lower polarizer and the liquid crystal display panel. Although the biaxial compensation film improves the contrast ratio at large viewing angles, color shift in the dark state is still a problem. Thus, there continues to be a need for a liquid crystal display device that has an improved performance quality at a reasonable cost.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A illustrates a liquid crystal display device according to an embodiment of the invention;

FIGS. 2A through 2G are contrast contour plots for some embodiments of the present invention;

FIG. 3 is a standard Commission Internationale de l'Eclairage (CIE) Chromaticity Diagram;

DETAILED DESCRIPTION

Figure 1B:
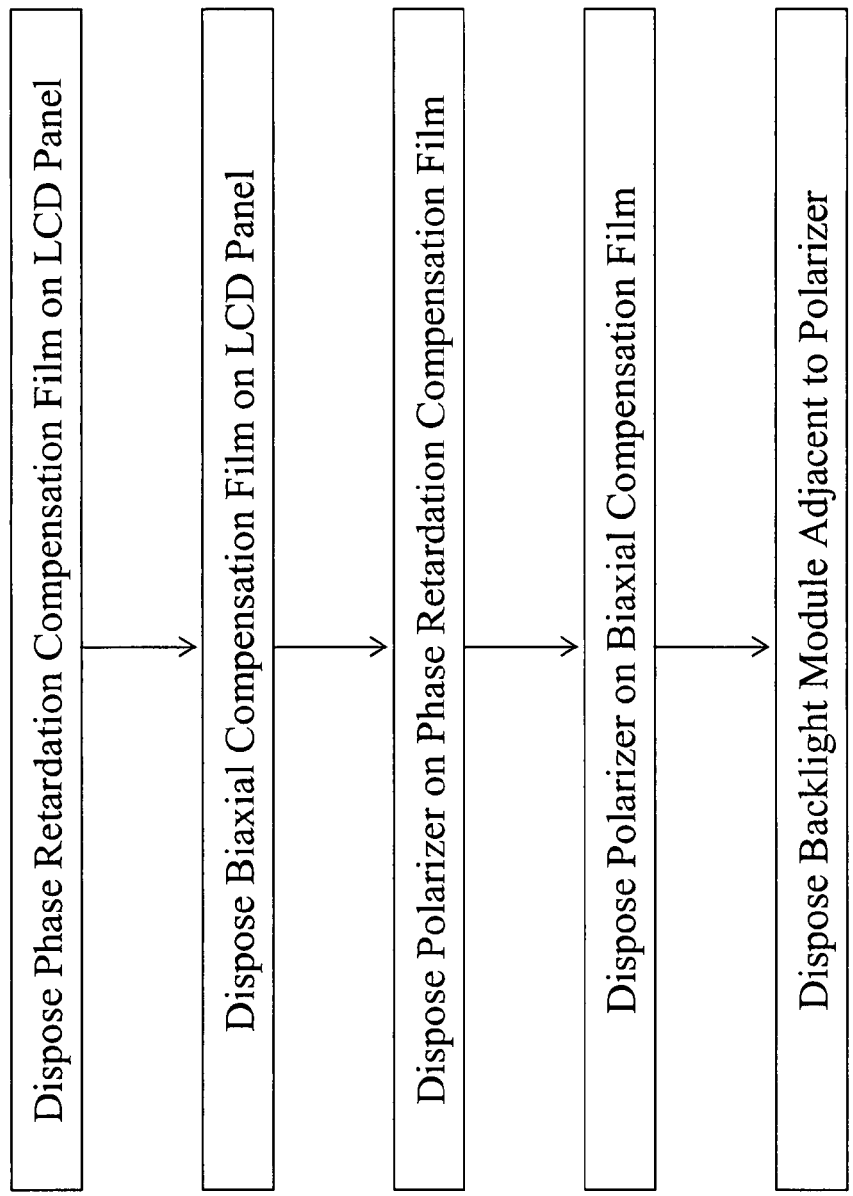
FIG. 1B is a flow chart for an embodiment of making the liquid crystal display device of FIG. 1A.

FIG. 1A depicts a liquid crystal display (LCD) device 10. The LCD device 10 has a liquid crystal display (LCD) panel 120 with a first side and a second side opposite the first side. The first side of the LCD panel 120 may include a color filter substrate whereas the second side may include a thin-film transistor substrate. The liquid crystal display device 10 may also include a phase retardation compensation film 130, a biaxial compensation film 140, a first polarizer 150, a second polarizer 160, and a backlight module 110. The first polarizer 150 and second polarizer 160 may each have a protection film 151, 161 and a polarizer film 152, 162 respectively. In some embodiments, the first protection film 151 and the second protection film 161 are made of triacetyl cellulose (TAC), and the first polarizer film 152 and the second polarizer film 162 are made of poly vinyl alcohol (PVC), although embodiments are not limited to these examples. Because the first polarizer 150 and the second polarizer 160 both include only two layers, the liquid crystal display device 10 of some embodiments is simpler than a conventional liquid crystal display with three-layer polarizers.

Referring to FIGS. 1A and 1B together, the phase retardation compensation film 130 has a thickness $d_1$ and the biaxial compensation film 140 has a thickness $d_2$. Both films 130 and 140 may be disposed on the liquid crystal display panel 120, one on the first side, the other on the second side. For example, in some embodiments, the phase retardation compensation film 130 may be a C-plate compensation film that is disposed on the first side of the LCD panel 120 and the biaxial compensation film 140 may be disposed on the second side of the LCD panel 120. It should be noted that the term "disposed on" refers to either directly on or indirectly on. Additionally, the first polarizer 150 may be disposed on the phase retardation compensation film 130, such that the first polarizer film 152 is between the first protection film 151 and the phase retardation compensation film 130. Similarly, the second polarizer 160 may be disposed on the biaxial compensation film 140 such that the second polarizer film 162 is between the biaxial compensation film 140 and the second protection film 161. The liquid crystal display panel 120 and films 130, 140, 151, 152, 161, and 162 are disposed adjacent to the backlight module 110. It should also be noted that the flow chart of FIG. 1B is illustrative; embodiments are not limited to a particular sequence of events.

In an embodiment of the liquid crystal display device 10, the phase retardation compensation film 130, such as a C-plate compensation film, and the biaxial compensation film 140 are used together to improve low contrast ratio and to reduce color shift in large viewing angles. That is, a phase retardation compensation film 130 and a biaxial compensation film 140 having particular optical compensation values may act together to reduce color shift in the dark state and to improve contrast ratios in the LCD device 10.

For example, in some embodiments, the phase retardation compensation film 130 may be a C-plate compensation film having a thickness $d_1$ and an optical compensation value $R_{th1}$ that is greater than or equal to 50 nm. The optical compensation value $R_{th1}$ is derived from the equation $[(n_{x1}+n_{y1})/2-n_{z1}] \times d_1$ where $n_{x1}$, $n_{y1}$, and $n_{z1}$ are refractive indices of the phase retardation compensation film 130 in a first direction x, a second direction y, and a third direction z. The third direction z is parallel to the normal direction of the surface of the phase retardation compensation film 130 and the biaxial compensation film 140. See, e.g., FIG. 1A. Another optical compensation value of the phase retardation compensation film 130 is $R_{o1}$. This compensation value is derived from the equation $(n_{x1}-n_{y1}) \times d_1$. In a C-plate compensation film, $n_{x1}$ equals $n_{y1}$; therefore, $R_{o1}$ is equal to zero.

Similarly, in some embodiments the biaxial compensation film 140 has a thickness of $d_2$ and an optical compensation value $R_{th2}$ that is greater than or equal to 50 nm. The optical compensation value $R_{th2}$ is derived from the equation $[(n_{x2}+n_{y2})/2-n_{z2}] \times d_2$ where $n_{x2}$, $n_{y2}$, and $n_{z2}$ are refractive indices of the biaxial compensation film 140 in a first direction x, a second direction y, and a third direction z. The third direction z is parallel to the normal direction of the phase retardation compensation film 130 and the biaxial compensation film 140. The biaxial compensation film 140 may have another optical compensation value $R_{o2}$, which is derived from the equation $(n_{x2}-n_{y2}) \times d_2$. In some embodiments, the optical compensation value $R_{o2}$ for the biaxial film 140 is in the range of about 50 nm to 70 nm.

Referring to Table 1, parameters are given for seven exemplary LCD devices (1-7) having different $R_{th1}$ and $R_{th2}$ combinations. The $R_{o2}$ value for each example was the same. Generally, C-plate compensation films 130 were disposed on the first side of LCD panels (the side having the color filter substrate) and biaxial compensation films 140 were disposed on the second side of LCD panels (the side having the thin-film transistor substrate). As is shown in Table 1, the optical compensation values $R_{th1}$ and $R_{th2}$ for each example is different, whereas the optical compensation value $R_{o2}$ in each example is 50 nm. Thus, according to Table 1, the first exemplary LCD device (1) has an optical compensation value $R_{th1}$ (for the C-plate film) of 50 nm and optical compensation values $R_{o2}$ and $R_{th2}$ (for the biaxial compensation film) of 50 nm and 224 nm respectively. Although not expressly shown in the table, it should be noted that for each example 2 through 7, the combined $R_{th1}$ and $R_{th2}$ value is 271 nm.

TABLE 1

|   | $R_{th1}$ (nm) | $R_{O2}/R_{th2}$ (nm) |
|---|---|---|
| 1 | 50 | 50/224 |
| 2 | 80 | 50/191 |
| 3 | 110 | 50/161 |
| 4 | 140 | 50/131 |
| 5 | 170 | 50/101 |
| 6 | 200 | 50/71 |
| 7 | 230 | 50/41 |

Figures 2A, 2B:
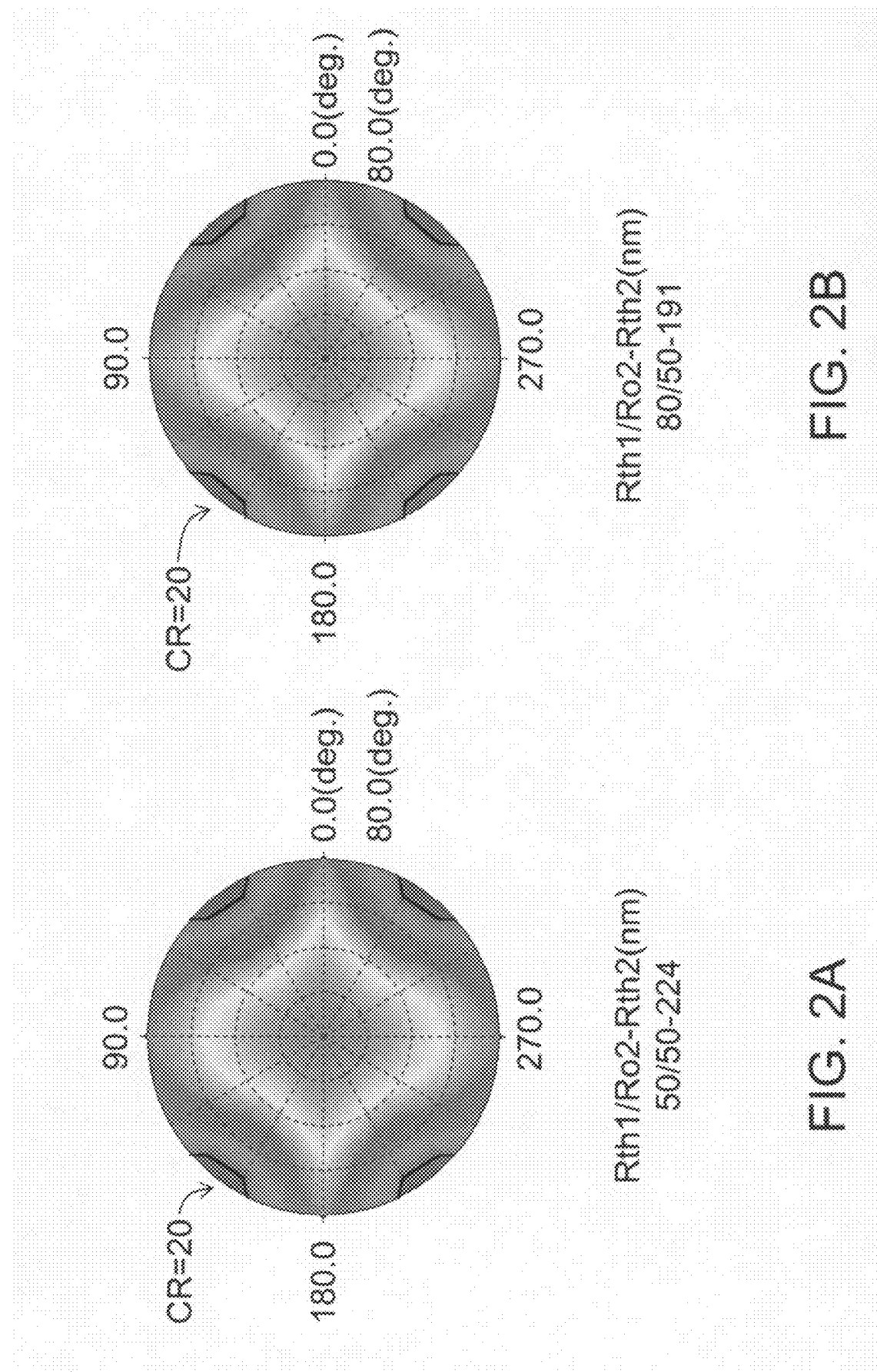
Figures 2E, 2F:
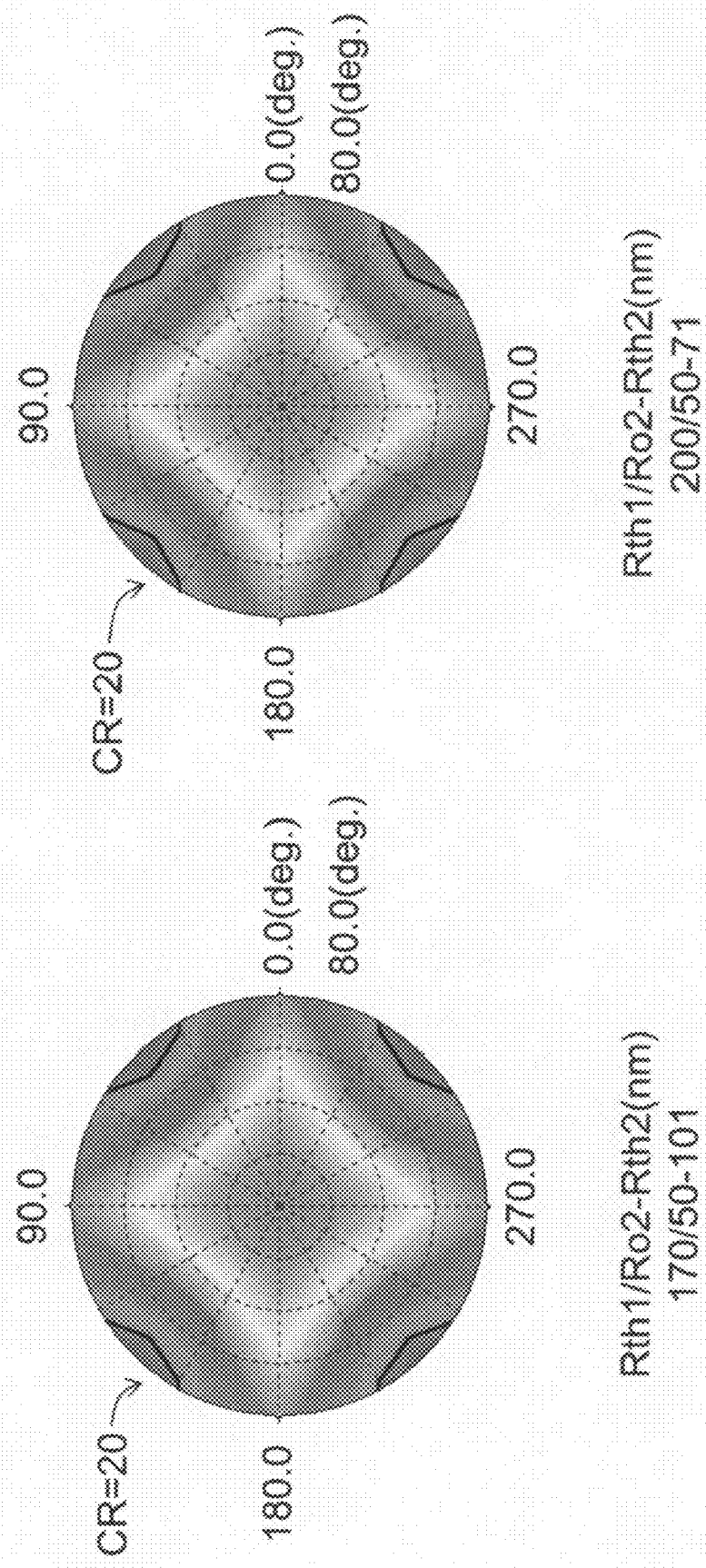

FIGS. 2A-2G are contrast contour plots for each respective exemplary device of Table 1. The contrast contour plots illustrate the relationship between the contrast ratio and viewing angle. Generally, viewing angle behavior is depicted by using the azimuth angle (φ) and the polar angle (θ) as parameters. As is shown in FIG. 2A, azimuth angles φ are shown at 0°, 90°, 180°, and 270° and polar angles θ range from −80° to +80°. As can be seen in these plots, the relationships between the contrast ratios and viewing angles is similar. That is, even though the $R_{th1}$ and $R_{th2}$ values are different and the $R_{o2}$ values are fixed, the contrast ratios (CR) are similar. Furthermore, when the azimuth φ is equal to 45°, 135°, 225°, or 315°, low contrast ratio is improved.

FIG. 3 shows a standard Commission Internationale de l'Eclairage (CIE) Chromaticity Diagram. Generally, the curve in the diagram encompasses all possible color mixtures that are visible to humans. Thus, the x and y coordinates of the curve define the color gamut. Typically, a conventional LCD device has a triangular color gamut that is less than the entire curve of the CIE Chromaticity Diagram. Furthermore, the color gamut for the conventional display will normally vary with viewing angle. Thus, at a given polar angle θ, when the x and y chromaticity coordinates change greatly according to a change of the azimuth φ, a user would observe a different color at the different positions due to serious color shift. If the color gamut defined by x and y coordinates at different azimuths φ is too large, color shift occurs.

Figure 4A:
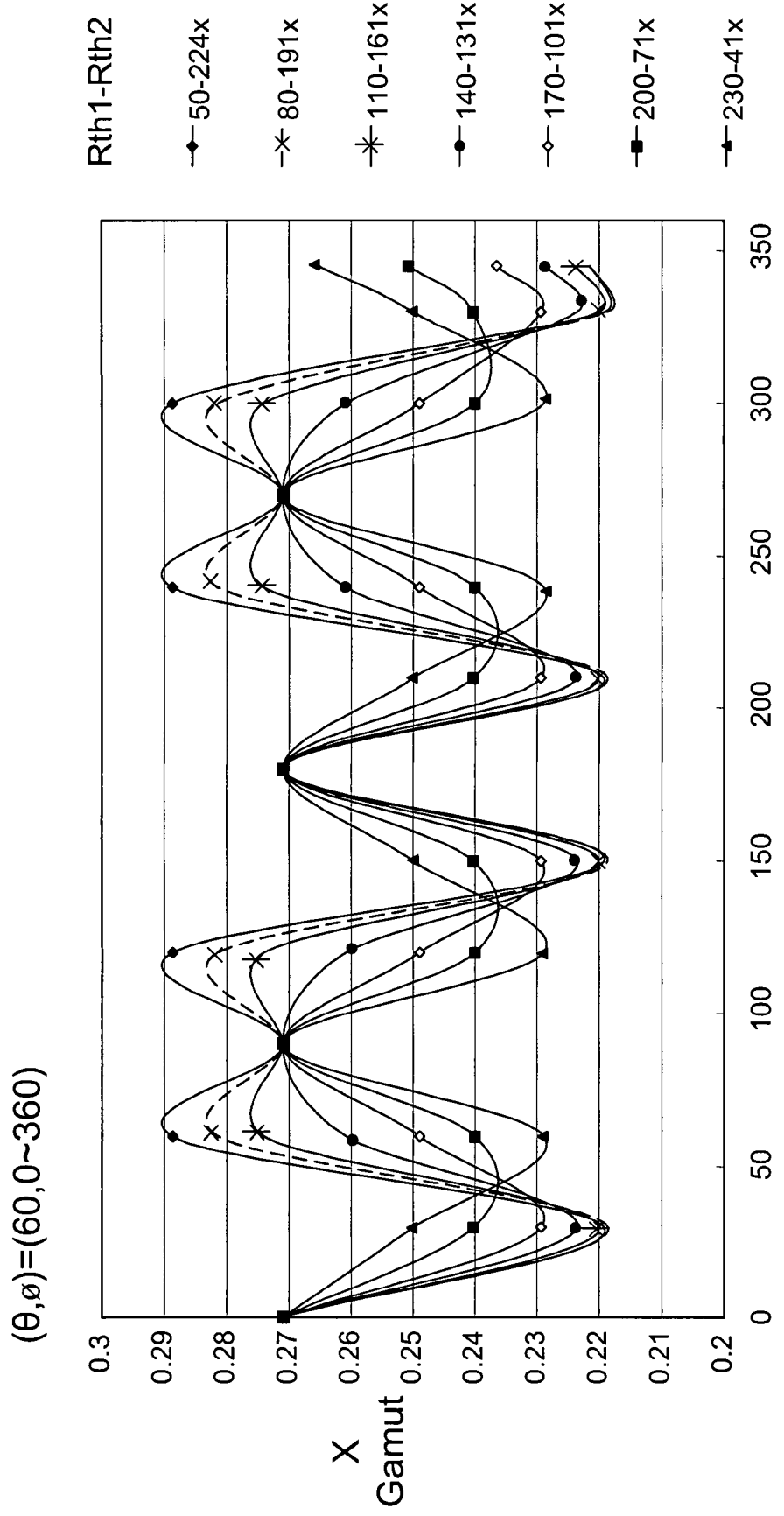
FIG. 4A is a graph showing the trends of the x color gamut for some embodiments.
Figure 4B:
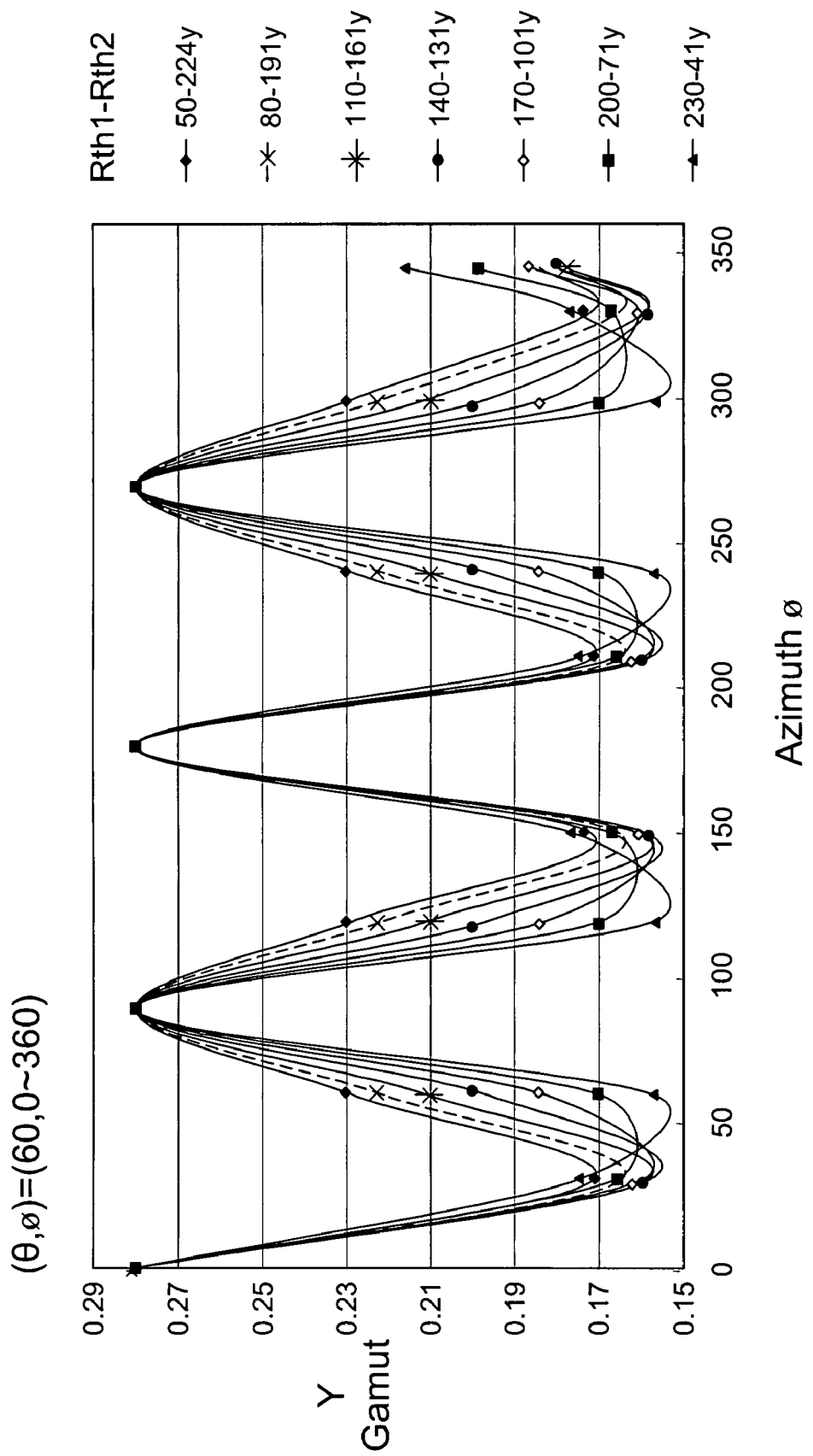
FIG. 4B is a graph illustrates the trends of the y color gamut for some embodiments.

According to an embodiment of the present invention, color shift in the dark state is reduced. In particular, color shift due to a single-side biaxial compensation film is reduced. The change of color gamut in the dark state for the examples of Table 1 are illustrated in FIGS. 4A and 4B, where the polar angle θ is 60° and the azimuth φ is from 0 to 360°. Specifically, FIG. 4A illustrates the trends of the x color gamut and FIG. 4B illustrates the trends of the y color gamut in liquid crystal display devices having the C-plate compensation film parameters and biaxial compensation film parameters as set forth in Table 1 when the polar angle θ is equal to 60°.

As is shown in FIG. 4A, the curvature of the x gamut curve changes more slowly when $R_{th1}$ is equal to or greater than 80 nm than when $R_{th1}$ is equal to 50 nm. The x gamut curve changes even more slowly when $R_{th1}$ is equal to 140 nm, 170 nm, 200 nm, or 230 nm and the $R_{th2}$ is equal to 131 nm, 101 nm, 71 nm, or 41 nm respectively. The x gamut curve changes the least when the $R_{th1}$ optical compensation value is equal to 200 nm and the $R_{th2}$ optical compensation value is equal to 71 nm with a fixed optical compensation value $R_{o2}$ of 50. Referring the FIG. 4B, the curvature of each y gamut curve does not change much when the azimuth φ is equal to 45°, 135°, 225°, and 315°. Similarly, when $R_{th1}$ is equal to 200 nm and $R_{th2}$ is equal to 71 nm, the y gamut curve has the best curvature.

Figure 5A:
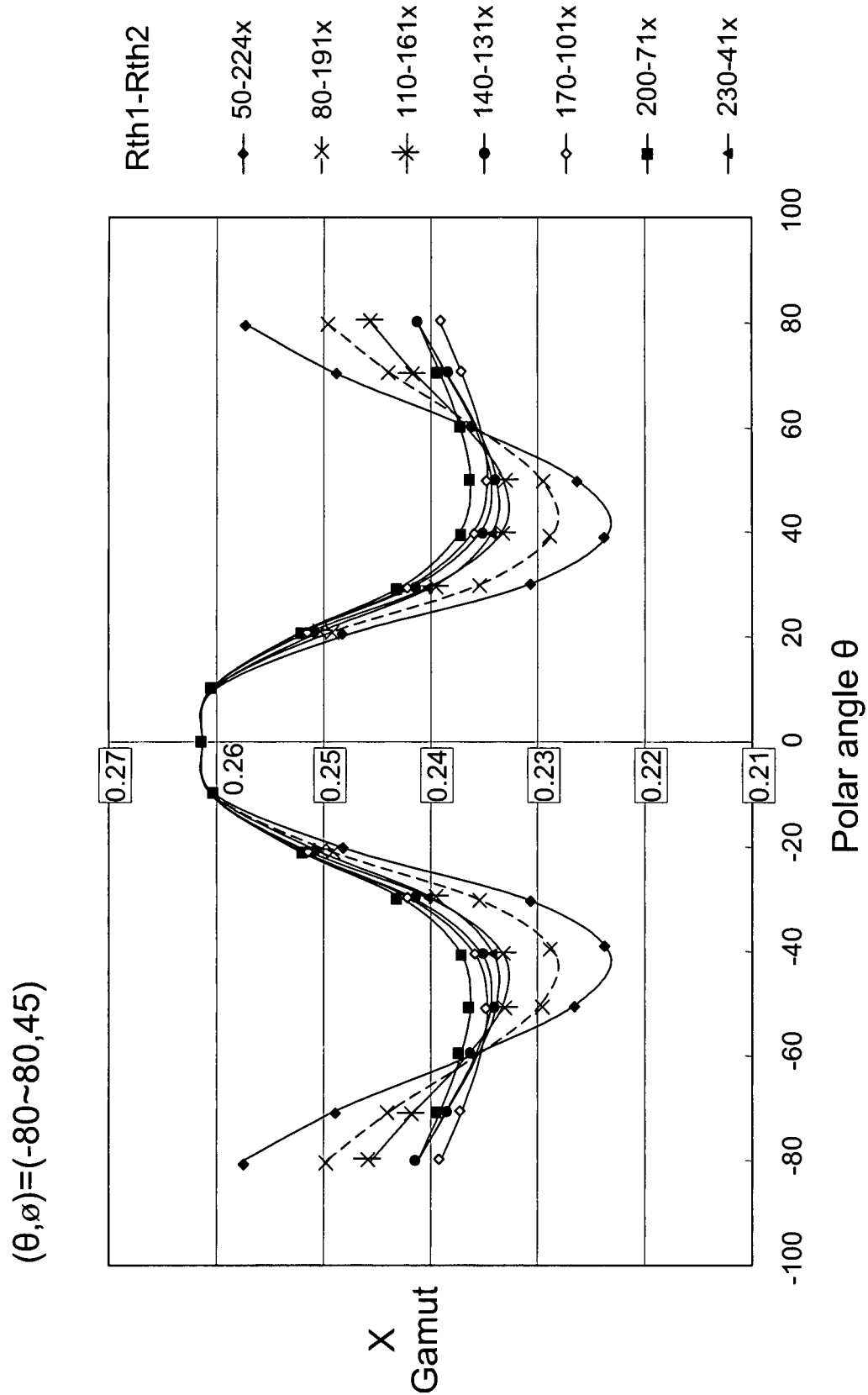
FIG. 5A is another graph illustrating the trends of the x gamut for some embodiments.
Figure 5B:
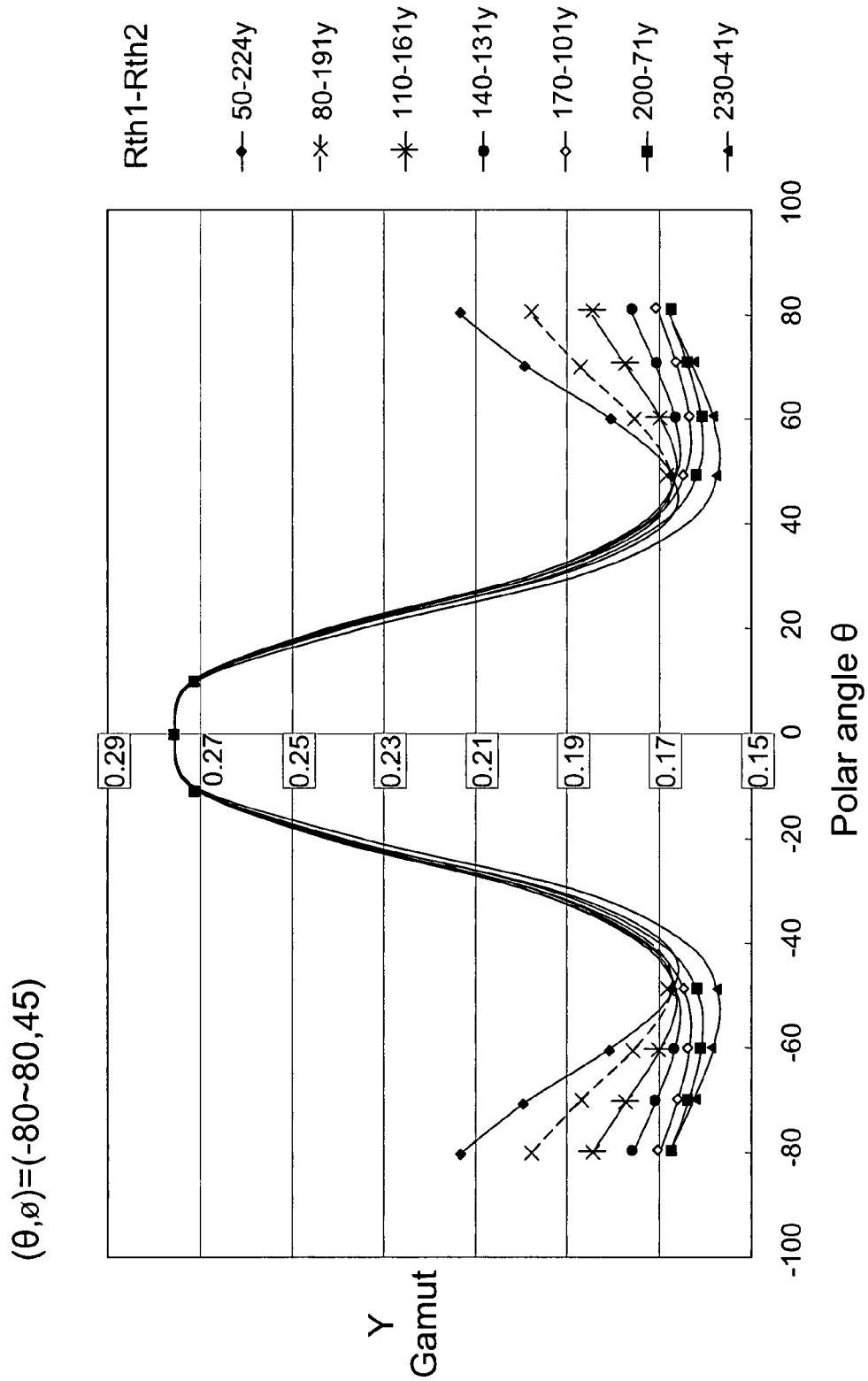
FIG. 5B is another graph that illustrates the trends of the y gamut for some embodiments.

FIGS. 5A and 5B show similar curves for the seven exemplary LCD devices according to Table 1 except that the change of color gamut in the dark state is illustrated when the azimuth φ is equal to 45° and the polar angle is from −80° to 80°. For example, FIG. 5A illustrates the trends of the x gamut in the liquid crystal display devices of Table 1 when the azimuth φ is equal to 45°, and FIG. 5B illustrates the trends of the y gamut in the liquid crystal display device of Table 1 when the azimuth φ is equal to 45°.

As is shown in FIGS. 5A and 5B, when $R_{th1}$ is equal to one of 140 nm, 170 nm, 200 nm, and 230 nm and the $R_{th2}$ is equal to one of 131 nm, 101 nm, 71 nm, and 41 nm respectively, the curvature of each x gamut curve and each y gamut curve changes more slowly. Notably, the least change in the curvature of the x gamut curve and the y gamut curve occurs when $R_{th1}$ is equal to 200 nm and $R_{th2}$ is equal to 71 nm.

In sum, according to various embodiments, visual effects with different contrast ratios are generated depending on the collocation of the $R_{th1}$, $R_{th2}$, and $R_{o2}$ of the phase retardation compensation film 130 and the biaxial compensation film 140. For example, low contrast ratio is improved when an azimuth is equal to 45°, 135°, 225°, or 315°, and color shift is reduced when the optical compensation value $R_{th1}$ of the phase retardation compensation film 130 is substantially equal to or greater than 80 nm, the optical compensation value $R_{th2}$ of the biaxial compensation film 140 is substantially equal to or greater than 70 nm, and the optical compensation value $R_{o2}$ of the biaxial compensation film 140 is substantially in the range of about 50 nm to 70 nm. In some embodiments, the compensation values $R_{th2}$ and $R_{o2}$ of the biaxial compensation film 140 are substantially in the range of about 70 nm to 230 nm and 50 nm respectively, and the compensation value $R_{th1}$ of the compensation film 130 is substantially in the range of about 80 nm to 200 nm.

Notably, when the sum of $R_{th1}$ and $R_{th2}$ is equal to 271 nm, color shift is reduced. In some embodiments, when $R_{th1}$ is in the range of about 170 nm to 200 nm, and the sum of $R_{th1}$ and $R_{th2}$ is equal to 271 nm substantially, color shift is more successfully reduced.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of manufacturing a liquid crystal display device that has a reduced color shift problem at a wide viewing angle when compared to a liquid crystal display device having a single-side biaxial compensation film, the method comprising:
   providing a liquid crystal display panel having a first side and a second side opposite the first side;
   disposing a C-plate phase retardation compensation film on the first side of said liquid crystal display panel, said C-plate phase retardation compensation film having an optical compensation value of $R_{th1}$, which is derived from the formula $[(n_{x1}+n_{y1})/2-n_{z1}] \times d_1$, wherein $n_{x1}, n_{y1}$, and $n_{z1}$ are refractive indexes for the C-plate phase retardation compensation film in a first direction, a second direction, and a third direction respectively, the first, second, and third directions each perpendicular to the other, the third direction normal to the surface of the C-plate phase retardation compensation film that is parallel to the adjacent first side of the liquid crystal display panel; and
   disposing a biaxial compensation film on the second side of the liquid crystal display panel, the biaxial compensation film having a first optical compensation value of $R_{th2}$, the sum of $R_{th1}$ and $R_{th2}$ substantially equal to 271 nm.

2. The method of claim 1 including deriving $R_{th2}$ based on the formula $[(n_{x2}+n_{y2})/2-n_{z2}] \times d_2$, wherein $n_{x2}, n_{y2}$, and $n_{z2}$ are refractive indexes for the biaxial compensation film in a first direction, a second direction, and a third direction respectively, the first, second, and third directions each perpendicular to the other, the third direction normal to the surface of the biaxial compensation film that is parallel to the adjacent first side of the liquid crystal display panel.

3. The method of claim 2 including deriving $R_{th1}$ such that $R_{th1}$ is greater than or equal to about 80 nm.

4. The method of claim 3 wherein deriving $R_{th1}$ includes deriving $R_{th1}$ such that $R_{th1}$ is substantially in the range of 80 nm to 230 nm.

5. The method of claim 3 wherein deriving $R_{th2}$ includes deriving $R_{th2}$ such that $R_{th2}$ is greater than or equal to about 70 nm.

6. The method of claim 5 wherein deriving $R_{th2}$ includes deriving $R_{th2}$ such that $R_{th2}$ is substantially in the range of 70 nm to 230 nm.

7. The method of claim 5 wherein disposing a biaxial compensation film includes disposing a biaxial compensation film having said first optical compensation value of $R_{th2}$ and a second optical compensation value of $R_{o2}$, wherein $R_{o2}$ is derived from the equation $(n_{x2}-n_{y2}) \times d_2$ and is substantially in the range of 50 nm to 70 nm.

8. The method of claim 1 wherein disposing a C-plate compensation film and disposing a biaxial compensation film includes disposing a C-plate compensation film and a biaxial compensation film that are adapted to improve a low contrast ratio at wide viewing angles as compared to a liquid crystal display device having a single-side biaxial compensation film.

9. A method of manufacturing a liquid crystal display device that has a reduced color shift problem at a wide viewing angle., the method comprising:
   disposing a phase retardation compensation film over one side of a liquid crystal display panel, said phase retardation compensation film having a thickness $d_1$ and an optical compensation value $R_{th1}$ greater than 79 nm, the optical compensation value $R_{th1}$ of the phase retardation compensation film derived from the equation $[(n_{x1}+n_{y1})/2-n_{z1}] \times d_1$, wherein $n_{x1}$ is a refractive index in a first direction, $n_{y1}$ is a refractive index in a second direction, and $n_{z1}$ is a refractive index in a third direction, the first direction. the second direction, and the third direction perpendicular to each other, the third direction parallel to the normal direction of the surface of the phase retardation compensation film; and
   disposing a biaxial compensation film on another side, opposite the one side, of the liquid crystal display panel.

10. The method of claim 9, wherein disposing a biaxial compensation film on another side of a liquid crystal display panel includes disposing a biaxial compensation film having a thickness $d_2$ and an optical compensation value $R_{th2}$ greater than 69 nm, the optical compensation value $R_{th2}$ derived from the equation $[(n_{x2}+n_{y2})/2-n_{z2}] \times d_2$, wherein $n_{x2}$ is the refractive index of the biaxial film in a first direction $n_{y2}$ the refractive index of the biaxial film in the second direction, and $n_{z2}$ is the refractive index of the biaxial film in the third direction, the third direction parallel to the normal direction of the surface of the biaxial compensation film.

11. The method of claim 10, wherein disposing a biaxial compensation film includes disposing a biaxial compensation film having an optical compensation value $R_{th2}$ in the range of about 70 nm to 230 nm.

12. The method of claim 10, wherein disposing a phase retardation compensation film and disposing a biaxial compensation film includes disposing a phase retardation compensation film and a biaxial compensation film having optical compensation values $R_{th1}$ and $R_{th2}$ that, in sum, equal about 271 nm.

13. The method of claim 10, wherein disposing a biaxial compensation film includes disposing a biaxial compensation film having another optical compensation value $R_{o2}$ of about 50 nm to about 70 nm, wherein $R_{o2}$ is derived from an equation of $(n_{x2}-n_{y2}) \times d_2$.

14. The method of claim 9, wherein $R_{th1}$ is substantially equal to or greater than 80 nm.

15. The method of claim 9, wherein the phase retardation compensation film is a C-plate compensation film.

16. The method of claim 9 further including disposing a first protection film over the phase retardation compensation film and a first polarizer film between the first protection film and the phase retardation compensation film, disposing a second protection film under the biaxial compensation film, and a second polarizer film between the second protection film and the biaxial compensation film, and situating a backlight module near the second protection film.

17. A liquid crystal display device that has a reduced color shift problem at wide viewing angles compared to a liquid crystal display device having a single-side biaxial compensation film, comprising:

a backlight module;

a liquid crystal display panel situated near the backlight module such that the backlight module is a light source for said liquid crystal display, the liquid crystal display panel having a first side and a second side opposite the first side;

a phase retardation compensation film disposed on the first side of the liquid crystal display panel, the phase retardation compensation film having a thickness of $d_1$, and an optical compensation value $R_{th1}$ that is substantially equal to or greater than 50 nm, $R_{th1}$ derived from the equation $[(n_{x1}+n_{y1})/2-n_{z1}]\times d_1$, wherein $n_{x1}$, $n_{y1}$ and $n_{z1}$ are refractive indexes in a first direction, a second direction, and a third direction respectively, the first direction, the second direction, and the third direction perpendicular to each other, the third direction parallel to the normal direction of the surface of the phase retardation compensation film;

a biaxial compensation film disposed between the second side of the liquid crystal display panel and the backlight module;

a first protection film disposed on the phase retardation compensation film;

a first polarizer film disposed between the first protection film and the phase retardation compensation film;

a second protection film disposed on the biaxial compensation film; and a second polarizer film disposed between the second protection film and the biaxial compensation film.

18. The device of claim 17, wherein the biaxial compensation film has a thickness $d_2$ and an optical compensation value $R_{th2}$ substantially equal to or greater than 70 nm, $R_{th2}$ derived from the equation $[(n_{x2}+n_{y2})/2-n_{z2}]\times d_2$, wherein $n_{x2}$, $n_{y2}$, and $n_{z2}$ are refractive indexes in the first direction, the second direction, and the third direction respectively.

19. The device of claim 18, wherein $R_{th2}$ is substantially in the range of about 70 nm to 230 nm.

20. The device of claim 19 wherein $R_{th1}$ is substantially in the range of about 80 nm to 200 nm.

* * * * *